US011895272B2

(12) United States Patent
Frenkel et al.

(10) Patent No.: US 11,895,272 B2
(45) Date of Patent: *Feb. 6, 2024

(54) SYSTEMS AND METHODS FOR PRIORITIZING EMERGENCY CALLS

(71) Applicant: NICE LTD., Ra'anana (IL)

(72) Inventors: Roman Frenkel, Ashdod (IL); Tal Raskin, Ramle (IL); Adi Ben Zeev, Tel Aviv-Jaffa (IL); Stav Mishory, Givat Hen (IL); Dan Teplitski, Tel Aviv (IL); Hadas Katz, Givatayim (IL)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,253

(22) Filed: Feb. 27, 2023

(65) Prior Publication Data

US 2023/0208976 A1 Jun. 29, 2023

Related U.S. Application Data

(63) Continuation of application No. 17/837,094, filed on Jun. 10, 2022, now Pat. No. 11,659,093, which is a (Continued)

(51) Int. Cl.
*H04M 3/523* (2006.01)
*G06F 40/295* (2020.01)
(Continued)

(52) U.S. Cl.
CPC ........ *H04M 3/5235* (2013.01); *G06F 40/295* (2020.01); *G10L 15/02* (2013.01); *G10L 15/26* (2013.01); *H04M 3/5116* (2013.01); *H04M 3/5166* (2013.01); *H04M 3/5183* (2013.01); *H04M 2201/405* (2013.01)

(58) Field of Classification Search
CPC ............ H04M 3/5235; H04M 3/5116; H04M 3/5166; H04M 3/5183; G06F 40/295; G10L 15/02; G10L 15/26
USPC ............ 379/266.07, 265.11, 265.13, 266.01, 379/265.05, 45, 37
See application file for complete search history.

(56) References Cited

U.S. PATENT DOCUMENTS 8,781,442 B1 * 7/2014 Link, II .................... H04L 9/30 370/338
8,976,939 B1 3/2015 Hamilton et al.
(Continued)

*Primary Examiner* — Thjuan K Addy
(74) *Attorney, Agent, or Firm* — Haynes and Boone, LLP

(57) ABSTRACT

Systems for and methods of determining the priority of a call interaction include receiving a call interaction from a call center; validating, by a validation and transcription engine, that the call interaction is authentic; converting, by the validation and transcription engine, the call interaction into text; calculating, by the data calculation engine, a priority of the call interaction from the text and organization, location, and time information in the text by determining an important of words in the text and correlating the words to a priority class using a pre-trained algorithm that is trained on emergency-type and emergency services-type language; determining that the call interaction should be transmitted to the call center for initial handling by a call center agent; and transmitting the call interaction, the calculated priority, and the extracted information to the call center.

20 Claims, 3 Drawing Sheets

Related U.S. Application Data continuation of application No. 17/197,742, filed on Mar. 10, 2021, now Pat. No. 11,375,063.

(51) Int. Cl.
  *G10L 15/02* (2006.01)
  *G10L 15/26* (2006.01)
  *H04M 3/51* (2006.01)

(56) References Cited

U.S. PATENT DOCUMENTS

| | | |
|---|---|---|
| 10,743,168 B1 | 8/2020 | Erenel et al. |
| 11,375,063 B1 | 6/2022 | Frenkel et al. |
| 2014/0072111 A1 | 3/2014 | Klaban |
| 2014/0094134 A1 | 4/2014 | Balthasar et al. |
| 2014/0211927 A1 | 7/2014 | Clawson |
| 2018/0288224 A1 | 10/2018 | Dizengof et al. |
| 2019/0068784 A1 | 2/2019 | Reddy |
| 2022/0303391 A1 | 9/2022 | Frenkel et al. |

\* cited by examiner

SYSTEMS AND METHODS FOR PRIORITIZING EMERGENCY CALLS

CROSS-REFERENCE TO RELATED APPLICATIONS

This application is a continuation of U.S. patent application Ser. No. 17/837,094, filed Jun. 10, 2022, now allowed, which is a continuation of U.S. patent application Ser. No. 17/197,742, filed Mar. 10, 2021, now U.S. Pat. No. 11,375,063, the entire contents of each of which is hereby incorporated herein by express reference thereto.

TECHNICAL FIELD

The present disclosure relates to methods, apparatus, and systems to prioritize emergency calls received at a call center, and more particularly, to methods, apparatus, and systems that determine the priority of a call interaction so that the most urgent call interactions are answered first.

BACKGROUND

Today, calls to emergency services are typically handled using a simple queue based on the time of the call (first in, first out). Once a call is answered, the dispatcher typically follows a set of rules for gathering case information and inputting the data manually by typing, which takes time. In addition, during the call, the dispatcher decides the case priority and must determine whether the information is valid. For some calls, however, every second is critical. Also, it is the dispatcher's responsibility to determine whether a call is valid or not. The response to such calls consumes valuable time and impairs the quality of service of the dispatcher.

The inability to quickly prioritize the load of incoming calls to emergency services during a standard work day can be fatal. This flaw is magnified during disaster relief. The increase in calls to emergency services during a disaster often results in a long wait time, when in many cases there is no time to wait.

Thus, there is a need for a solution that will allow emergency call center systems to create case information automatically and send the information immediately to the correct emergency service, without waiting for a dispatcher, which decreases valuable time.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
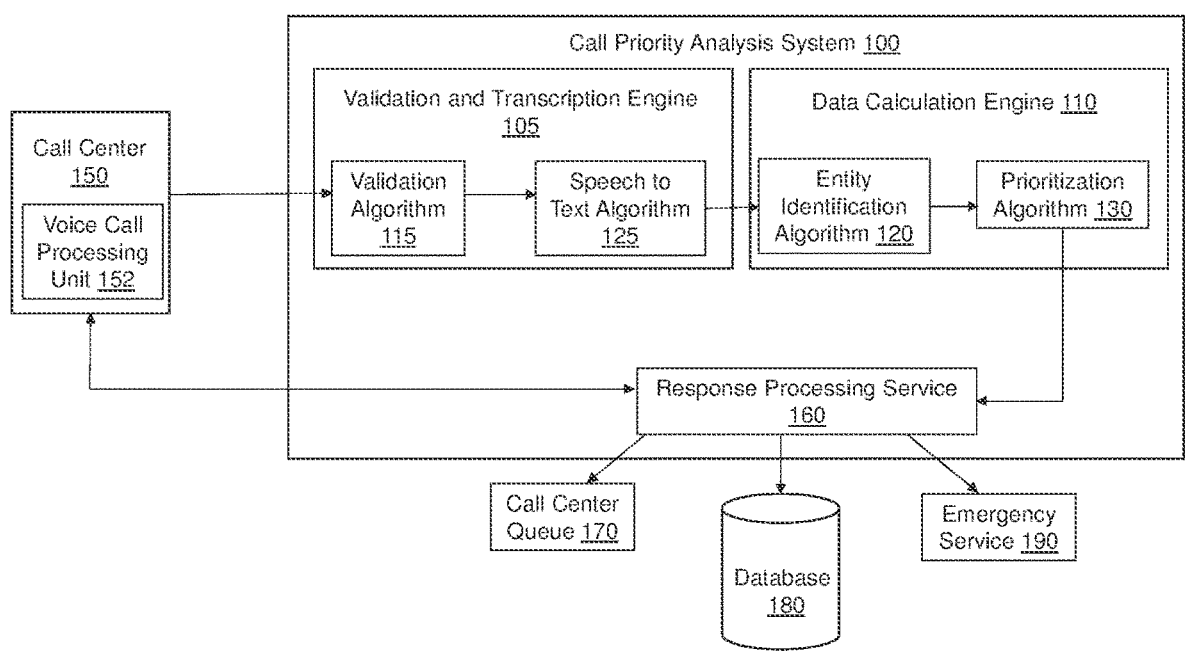
FIG. 1 is a simplified block diagram showing the different components of the call priority analysis system according to aspects of the present disclosure.

This description and the accompanying drawings that illustrate aspects, embodiments, implementations, or applications should not be taken as limiting—the claims define the protected invention. Various software, machine learning, mechanical, compositional, structural, electrical, and operational changes may be made without departing from the spirit and scope of this description and the claims. In some instances, well-known machine logic, circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The present disclosure describes systems and methods that process call information even before it reaches a call center agent (also referred to herein as a dispatcher) for emergency call centers and helps determine whether or not a call interaction should reach an agent and the priority in which a set of calls should reach an agent. In particular, the present systems and methods use algorithms to analyze and extract data from a call interaction for automatic prioritization and routing instead of requiring a human agent to prioritize and route such call interactions. In various embodiments, a validation algorithm, a speech to text algorithm, an entity identification algorithm, and a prioritization algorithm are used.

In several embodiments, when a call interaction is received at a call center, a call priority analysis system validates that the call is reliable, transcribes the call interaction from speech to text, extracts the location of the call interaction, the case description, and the caller details, calculates the priority of the call interaction according to a protocol or other set of rules, and determines whether the call interaction requires an agent handle and returns it to the queue for follow up. In some embodiments, the call priority analysis system performs these steps in real-time (e.g., the steps are performed as the data comes in). Advantageously, each call interaction is responded to with shorter wait times, processed, saved, and given attention in order of priority. Preferably, all emergency calls are handled faster by de-prioritizing non-emergency calls.

In addition, handling of the call interaction is begun before it reaches an agent. The agent responds only to valid call interactions and only if agent handling is needed. Moreover, the case information may advantageously be sent to the relevant emergency service automatically.

In certain embodiments, a combination of technologies is utilized. For example, speech to text algorithms may be used on incoming call interactions, named entity recognition (NER) algorithms may be used to extract information from the call interaction before an agent receives the call interaction, and a gradient-boosted tree algorithm such as an eXtreme gradient boosting (XGBoost) algorithm may be used to implement call prioritization. In various embodiments, the XGBoost algorithm is pre-trained on hand-crafted probabilistic grammar. The probabilistic grammar preferably relates to emergency-type and emergency services-type language.

The present systems and methods may provide several advantages. First, they can be used in emergency call centers to improve public safety. It is well understood that lives are saved when emergency services can respond more quickly to a critical incident, e.g., fire, active shooter situations, armed robbery, heart attack or stroke, or any other service with improved resolution when handled on an emergency basis. While the methods and systems described herein can be implemented in public safety systems, it should be understood that they can also be used in any type of call center to decrease call wait times and prioritize call connections on other bases. Companies can build their organization priority by selecting important keywords, such as a product for sale, unsatisfied customers, clients that want to discontinue the service, customer loyalty, most recent customers, and more. Finally, the present methods and systems change the flow of a call interaction in a call center to ensure that the most important and urgent call interactions are answered first (or for non-emergency call interactions, on any other suitable basis). This is especially important when a natural disaster or other emergency occurs.

FIG. 1 is a simplified block diagram showing the different components of the call priority analysis system 100 according to various aspects of the present disclosure. FIG. 1 includes call center 150. The term "call center," as used herein, can include any facility or system server suitable for receiving and recording electronic call interactions from contacts. One such example is a call analytics center. Such call interactions can include, for example, telephone calls, voice over IP ("VoIP") and video. In various aspects, real-time interactions, such as voice, video, or both, is preferably included. It is contemplated that these interactions may be transmitted by and through any type of telecommunication device and over any medium suitable for carrying data. For example, the communications may be transmitted by or through telephone lines, cable, or wireless communications.

As shown, call center 150 includes a voice call processing unit 152. The voice call processing unit 152 is generally a hardware unit set in the call center, such as an automatic call distributor (ACD) or a distributed private branch exchange (PBX), that receives call interactions. An ACD distributes call interactions or tasks to agents. Generally, an ACD is part of a switching system designed to receive call interactions and queue them. In one embodiment, the ACD is integrated with a PBX switch, and directs call interactions to one of a plurality of agent workstations. ACDs are specialized systems that are configured to match call interactions to an available call center agent. ACDs generally receive incoming call interactions, determine where to route a particular call interaction, and connect the call interaction to an available agent. For the purposes of the present disclosure, "ACD" refers to any combination of hardware, software and/or embedded logic that is operable to automatically distribute incoming call interactions, including requests for service transmitted using any audio and/or video means, including signals, data or messages transmitted through voice devices, text chat, web sessions, facsimile, instant messaging and e-mail.

Call priority analysis system 100 receives data from call center 150 (e.g., from voice call processing unit 152) and processes the data to determine the priority of a call interaction. As shown, call priority analysis system 100 includes validation and transcription engine 105, data calculation engine 110, and response processing service 160.

Validation and transcription engine 105 includes validation algorithm 115 and speech to text algorithm 125. Validation algorithm 115 takes a call interaction and determines whether or not the call interaction is authentic or valid. For example, validation algorithm 115 can analyze the call interaction for noises, laughter, or certain words. Laughter can be evidence that the call interaction is not authentic and is a potential prank call. Speech to text algorithm 125 converts speech into text by detecting, for example, words and phonemes. A speech signal is the input for speech to text algorithm 125, and this speech signal is represented by an array of bytes. These bytes are usually a representation of speech samples, where in many cases 1 or 2 bytes represent a single sample. Speech to text algorithm 125 produces the call transcription, represented by a string arrange (the phonetic/word-based textual representation of what has been said). In some embodiments, validation algorithm 115 accepts the textual representation and decides if the call interaction is a valid call to be processed, where the decision is represented by a boolean variable.

Data calculation engine 110 includes entity identification algorithm 120 and prioritization algorithm 130. If valid, entity identification algorithm 120 accepts the textual representation and produces the informative elements in the call interaction. The data structure to hold this data is often a key (e.g., json, xml, dict, etc.), and this data structure can be passed to external processes via an API. For example, when a fire is reported, the alarm in the fire department is first called so the fire fighters will get ready, and then the call is followed up with an agent, so that precious time is not wasted. The data structure is also passed to prioritization algorithm 130, which determines the priority based on the internal artificial intelligence (AI) core.

According to various embodiments, entity identification algorithm 120 classifies named entities mentioned in the text into pre-defined categories such as organization names, locations, and time expressions. In some embodiments, prioritization algorithm 130 takes the text and maps it to a class of priority. The priority is then passed to response processing service 160. In certain embodiments, the priority is represented as an integer number, but can also be a string or a float.

Response processing service 160 receives data from call center 150 (e.g., voice call processing unit 152) and data calculation engine 110. Based on the received data, response processing service 160 makes a decision whether the call interaction should be sent back to the call center queue for agent follow-up. The output of the response processing service 160 can be uploaded to database 180 if needed, or can be sent to a user interface, call center, emergency service 190, dashboard, analysis tool, internal system, or external system via an application programming interface (API) or via streams. In various embodiments, the output includes one of more of the following: a timestamp, the case description, the priority, the location, the caller name, the caller phone number, and whether or not an agent is needed. As can be seen, the priority can be outputted for various external processes, including but not limited to the call center queue.

Figure 2:
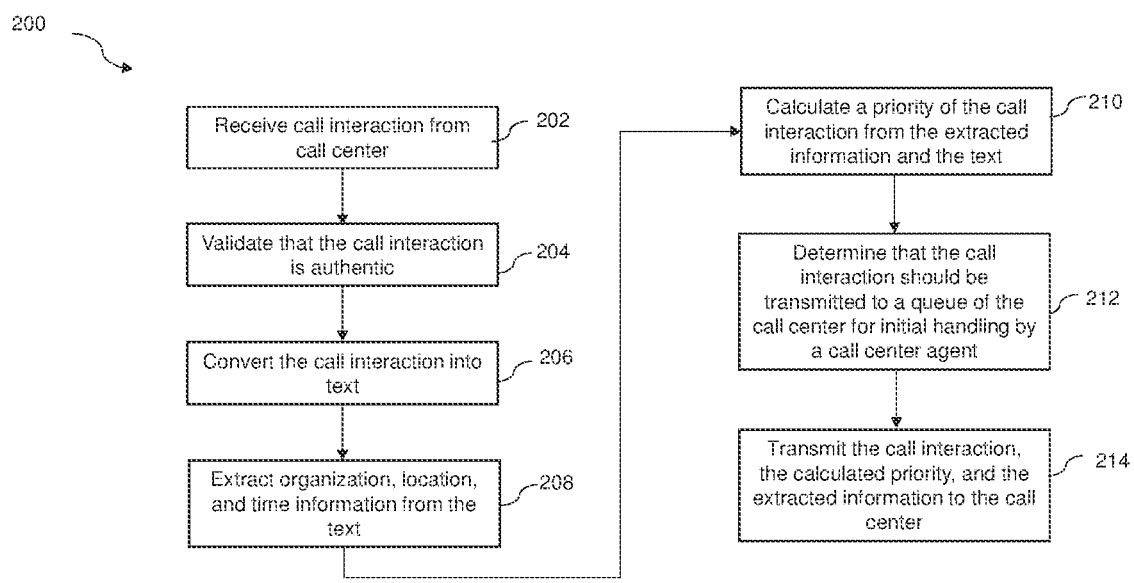
FIG. 2 is a flowchart of a method of determining the priority of a call interaction according to embodiments of the present disclosure.

Referring now to FIG. 2, a method 200 for determining the priority of a call interaction is described. At step 202, call priority analysis system 100 receives a current call interaction from call center 150. In various embodiments, call center 150 is an emergency call center that employs emergency dispatchers. In certain embodiments, the current call interaction includes emergency case location, the caller information, and the case description.

At step 204, call priority analysis system 100, via the validation and transcription engine 105, validates that the current call interaction is authentic and not a prank call. In various embodiments, validation algorithm 115 determines whether the current call interaction is valid or not. For example, validation algorithm 115 analyzes an amount of noise on the current call interaction, detects whether there is laughter on the current call interaction, evaluates words in the current call interaction, or any combination thereof. Validation algorithm 115 acts as a filter layer, stopping irrelevant call interactions from being analyzed so that the system and method as a whole are more efficient and priority interactions are expedited further as a result. In several embodiments, the filtering of call interactions uses various modules, where each module is different, based on the validation. For example, a voice activity detector (VAD) can be used to detect the percentage of noise on the current call interaction or a laugh detection module can be used to detect the presence of laughter. The words used in the current call interaction may also be evaluated to determine if there are any words triggering invalidity of the current call interaction. If the current call interaction is not valid, the current call interaction does not proceed to the next step.

If the current call interaction is authentic, method 200 proceeds to step 206, where call priority analysis system 100, via the speech to text algorithm 125, converts the current call interaction into text or a textual call transcription. In certain embodiments, the current call interaction is converted to text in real-time. Although method 200 illustrates that the current call interaction is first validated and then converted to text, it should be understood that the current call interaction may be first converted to text and then validated.

In various embodiments, the conversion of speech to text includes detecting a word, a phoneme, or both, and is performed in a two-track flow. For example, converting the current call interaction into text can include detecting a word, a phoneme, or both.

In some embodiments, the word-based track simply runs a comparison of one to many, where the input is an audio segment, and this is converted to a different representation that is then compared to a dictionary of such representations. Other considerations, such as grammatical structure (e.g., "is" cannot be said twice in a row, and a verb, adjective, or noun is more likely to follow the term) may also be analyzed. While this approach is generally accurate, there are more "out of dictionary" words since language is always evolving. The dictionary needs to be constantly updated, and sometimes it is difficult to keep up with the change. This is the reason the phonetic-based track is also generally used concurrently or sequentially to analyze the audio or text.

In the phonetic-based track, the audio is converted to phonemes, where a phoneme is a short sound that is produced by the mouth and/or nose. With this approach, new words can be detected that do not exist in the dictionary using the phonetic transcription. Parallel to the grammatical structure, with this approach, a-priori statistics, namely probabilities of phonetic transitions are also considered.

Phonetic transitions are more tied to physical constraints. For example, there cannot be two continuous plosives ("p"+ "p"). There has to be a break between them for air to leave the mouth. After an audio segment is converted into a phonetic transcription, another dictionary is used that converts them to the most probable textual representation (a term). This process can be done such that no matter what, a certain word will be produced, even if it is a new word (for example "selfie," which emerged in the past few years, can be created through this approach, for example, "my BFF fell over the cliff while taking a selfie!").

In both tracks, the words or phonemes can be extracted through either classical machine learning (ML) approaches or more modern deep learning (DL) approaches.

Examples of classical ML approaches for word or phoneme detection include Bassian approaches such as a hidden Markov model (HMM) with probabilistic models, such as a Gaussian mixture model (GMM). Non-Bassian approaches include dynamic time warping (DTW) and general pattern matching approaches.

Examples of modern DL approaches for word or phoneme detection include use of a recurrent neural network (RNN), a convolutional neural network (CNN), a gated recurrent unit (GRU), capsule networks, and residual networks. Often various layers of the different networks are combined for targeted applications.

At step 208, call priority analysis system 100, via entity identification algorithm 120, extracts organization, location, and time information from the text of the current call interaction. In certain embodiments, call priority analysis system 100 detects various entities for documentation and automatic call handling.

In some embodiments, the transcription text is pre-processed to output a numeric representation for the words in the text. For example, for each call transcription, a pre-processing unit splits the text to words and cleans the text by removing punctuation, stop words, duplicative words, and plural words. In various embodiments, the pre-processing unit also maps each word to a numeric representation of the word. The numeric representation is a unique number or an embedding vector, which is a vector of continuous numbers that represent a word's semantic meaning.

In some embodiments, extraction of organization, location, and time information includes applying a named entity recognition (NER) model to the text. The NER model identifies and categorizes key information (entities) in the text. An entity can be any word or series of words that consistently refer to the same thing. Every detected entity is classified into a predetermined category (e.g., organization, location, or time). The NER model, in various embodiments, classifies named entities mentioned in transcription text into predefined categories such as organization names, locations, and time expressions. For example, the numeric representation for each word can be fed into a pre-trained NER model to obtain an entity tag or category for each word that is an organization name, a location, or a time. In several embodiments, the NER model is pre-trained on deep convolutional and residual layers that detect and categorize the entity.

At step 210, call priority analysis system 100, via prioritization algorithm 130, calculates a priority of the current call interaction from the extracted information and the text. In various embodiments, calculating the priority is based on a protocol or set of rules. In some embodiments, call priority analysis system 100 saves the calculated priority and the extracted information in a database (e.g., database 180). In certain embodiments, prioritization algorithm 130 classifies the given information into a priority class or level (e.g., high, medium, or low; 1, 2, or 3; or red, yellow, or green). The priority of the current call interaction is preferably set by the algorithm according to an agreed protocol.

In certain embodiments, prioritization algorithm 130 takes the text and maps the text to a priority class (e.g., high, medium, or low). This type of task is called text classification in the natural language understanding (NLU) domain. Examples of classical approaches to text classification include use of support vector machines (SVM), logistic regression, and random forest algorithms. Examples of modern approaches to text classification include the use of XGBoost algorithms, long short-term memory (LSTM) networks, bidirectional LSTM (BiLSTM) networks, and transformers.

In several embodiments, calculation of the priority of the current call interaction includes first training a gradient-boosted tree algorithm (e.g., an XGBoost algorithm) to weigh an importance of the words in the text and provide a priority class of a call interaction. In various embodiments, calculation of the priority of the current call interaction includes determining the importance of words in the text and correlating the words in the text to a priority class by using the trained model. In some embodiments, calculation of the priority of the current call interaction includes applying the weights learned and saved from the gradient-boosted tree algorithm to the words of the text. For example, the saved weights for the words that are found in the current call interaction are provided to the trained gradient-boosted tree algorithm to output the priority class (e.g., 1, 2, or 3).

For example, on a set of previous call description texts that are represented as a set of token IDs as attributes, a pre-processing unit splits the text to words and maps each word to a numeric representation (e.g., a unique ID or an embedding vector as described above). This mapping is saved as a dictionary that maps a word to a number or an embedding vector. In various embodiments, a set of indicators for a priority class or a priority level (e.g., high, medium, or low; 1, 2, 3; or red, yellow, or green) is decided on and based on the emergency service policy.

Next, the numeric representation of the words from the text and previous tags from extracted information are provided to a feature extractor to determine the weight or the importance of specific words. In certain embodiments, determining the importance of specific words in the text includes applying term frequency-inverse document frequency (TFIDF) to the text. TFIDF is a numerical statistic that reflects how important a word is in the text. TFIDF is calculated by multiplying two metrics: how many times a word appears in the current text and the inverse document frequency of the word across all call description text. "TF" is the scoring of the frequency of the word in a current call description text, and "IDF" is a scoring of how rare the word is across all call description text. The TFIDF score highlights words that are distinct (content useful information) in a given text. In some cases, the more distinct the word, the more weight or the more importance the word is given. Below is a preferred formula used to calculate TFIDF.

$$w_{i,j} = tf_{i,j} \times \log\left(\frac{N}{df_i}\right)$$

$tf_{i,j}$=number of occurrences of i in j
$df_i$=number of documents containing i
N=total number of documents The feature extractor calculates weights for words in order to provide higher weights to domain specific words, particularly words associated more with an emergency (or in non-emergency embodiments, other priority words like "long-standing customer"). For example, "dog" may have a weight of 0.3 while "fire" or "earthquake" may have a weight of 0.6.

Next, the normalized TFIDF vectors or weights are inserted to train a gradient-boosted tree algorithm (e.g., an XGBoost model) to learn weights for the words. For example, the weight of the words are used as the input for the XGBoost model, which uses the weight to predict a priority class. Thus, the weights of the words are correlated to one or more priority classes. The "fit" function fits the gradient-boosted tree algorithm and learning the words' weights in respect to the priority (training phase of the algorithm). In various embodiments, the model word weights are saved to calculate the priority of the current call interaction and for research and monitoring of model performance.

In some embodiments, the trained gradient-boosted tree algorithm is used to determine the priority of the current call interaction, and the trained gradient-boosted tree algorithm is applied to the text of the current call interaction. In various embodiments, the transcription text of the current call interaction is first pre-processed to output a numeric representation for the words (as explained above with respect to step 208). In certain embodiments, a pre-processing unit loads a dictionary (e.g., the dictionary from step 210) and maps each word to a numeric representation (e.g., a unique ID or an embedding vector) based on the dictionary. In these embodiments, the gradient-boosted tree algorithm (e.g., XGBoost model) is applied to a new call interaction directly, such that no tags and no priority calculations or correlations are needed.

At the end of the analysis process, all collected current call interaction data is sent to response processing service 160 to create the system response to the current call interaction. The system response contains the data needed for emergency services to respond, and can be sent to the relevant emergency service (or services) immediately.

At step 212, call priority analysis system 100 determines that the current call interaction should be transmitted to a queue of the call center for initial handling by a call center agent. In this case, a dispatcher follow-up is needed. In other cases, the system response can be used for display, dashboards, analytics, documentation, and/or records. Call priority analysis system 100 can also save the call information in a database for subsequent analysis, training of one or more of the algorithms discussed herein, or official government, law enforcement, or judicial uses or investigations.

At step 214, call priority analysis system 100 transmits the current call interaction, the calculated priority, and the extracted information to the call center 150. In some embodiments, call priority analysis system 100 transmits the calculated priority and the extracted information to emergency service 190.

Figure 3:
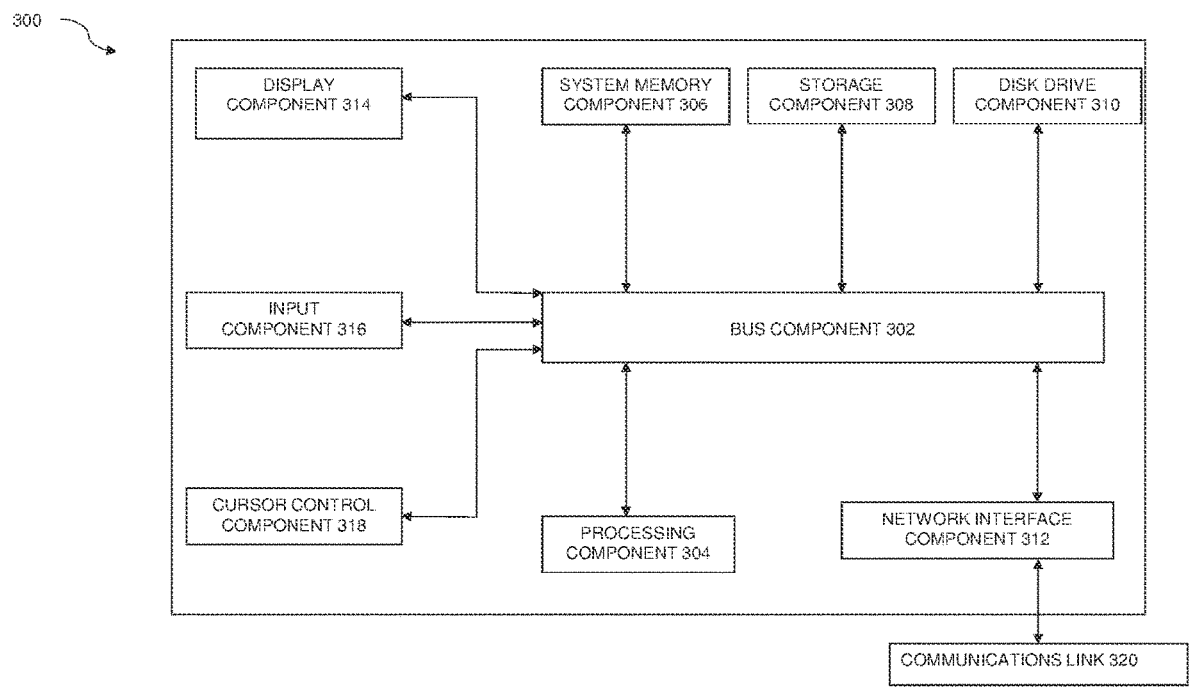
FIG. 3 is a block diagram of a computer system suitable for implementing one or more components in FIG. 1 according to one embodiment of the present disclosure.

Referring now to FIG. 3, illustrated is a block diagram of a system 300 suitable for implementing embodiments of the present disclosure, including call priority analysis system 100. System 300, such as part a computer and/or a network server, includes a bus 302 or other communication mechanism for communicating information, which interconnects subsystems and components, including one or more of a processing component 304 (e.g., processor, micro-controller, digital signal processor (DSP), etc.), a system memory component 306 (e.g., RAM), a static storage component 308 (e.g., ROM), a network interface component 312, a display component 314 (or alternatively, an interface to an external display), an input component 316 (e.g., keypad or keyboard), and a cursor control component 318 (e.g., a mouse pad).

In accordance with embodiments of the present disclosure, system 300 performs specific operations by processor 304 executing one or more sequences of one or more instructions contained in system memory component 306.

Such instructions may be read into system memory component 306 from another computer readable medium, such as static storage component 308. These may include instructions to receive a call interaction from a call center; validate, by a validation and transcription engine, that the call interaction is authentic; convert, by the validation and transcription engine, the call interaction into text; extract, by a data calculation engine, organization, location, and time information from the text; calculate by the data calculation engine, a priority of the call interaction from the extracted information and the text; determine that the call interaction should be transmitted to a queue of the call center for initial handling by a call center agent; and transmit the call interaction, the calculated priority, and the extracted information to the call center.

In other embodiments, hard-wired circuitry may be used in place of or in combination with software instructions for implementation of one or more embodiments of the disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, volatile media includes dynamic memory, such as system memory component 306, and transmission media includes coaxial cables, copper wire, and fiber optics, including wires that comprise bus 302. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 300. In various other embodiments, a plurality of systems 300 coupled by communication link 320 may perform instruction sequences to practice the disclosure in coordination with one another. Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A call priority analysis system comprising:
a processor and a computer readable medium operably coupled thereto, the computer readable medium comprising a plurality of instructions stored in association therewith that are accessible to, and executable by, the processor, to perform operations which comprise:
receiving a call interaction from a call center;
validating, by a validation and transcription engine, that the call interaction is authentic;
converting, by the validation and transcription engine, the call interaction into text;
calculating, by a data calculation engine, a priority of the call interaction from the text and organization, location, and time information in the text, wherein calculating the priority of the call interaction comprises determining an importance of words in the text and correlating the words in the text to a priority class by using a pre-trained algorithm that is trained on emergency-type and emergency services-type language;
determining that the call interaction should be transmitted to the call center for initial handling by a call center agent; and
transmitting the call interaction, the calculated priority, and the organization, location, and time information to the call center.

2. The call priority analysis system of claim 1, wherein the pre-trained algorithm is pre-trained on hand-crafted probabilistic grammar.

3. The call priority analysis system of claim 1, wherein the pre-trained algorithm comprises a trained tree algorithm.

4. The call priority analysis system of claim 3, wherein the trained tree algorithm comprises a trained gradient-boosted tree algorithm.

5. The call priority analysis system of claim 1, wherein the operations further comprise saving the calculated priority and the organization, location, and time information in a database.

6. The call priority analysis system of claim 5, wherein the operations further comprise extracting, by the data calculation engine, the organization, location, and time information from the text, wherein extracting the organization, location, and time information comprises applying a named entity recognition (NER) model to the text.

7. The call priority analysis system of claim 1, wherein the operations further comprise transmitting the calculated priority and the organization, location, and time information to an emergency service, and wherein determining that the call interaction should be transmitted to the call center for initial handling by a call center agent comprises determining that the call interaction should be transmitted to a queue of the call center.

8. The call priority analysis system of claim 1, wherein validating the call interaction comprises analyzing an amount of noise on the call interaction, detecting whether there is laughter on the call interaction, evaluating words in the call interaction, or any combination thereof.

9. The call priority analysis system of claim 1, wherein determining the importance of the words in the text comprises applying term frequency-inverse document frequency (TFIDF) to the text.

10. A method of determining the priority of a call interaction, which comprises:
receiving a call interaction from a call center;
validating, by a validation and transcription engine, that the call interaction is authentic;
converting, by the validation and transcription engine, the call interaction into text;
calculating, by a data calculation engine, a priority of the call interaction from the text and organization, location, and time information in the text, wherein calculating the priority of the call interaction comprises determining an importance of words in the text and correlating the words in the text to a priority class by using a pre-trained algorithm that is trained on emergency-type and emergency services-type language;
determining that the call interaction should be transmitted to the call center for initial handling by a call center agent; and transmitting the call interaction, the calculated priority, and the organization, location, and time information to the call center.

11. The method of claim 10, wherein the pre-trained algorithm is pre-trained on hand-crafted probabilistic grammar.

12. The method of claim 10, wherein the pre-trained algorithm comprises a trained tree algorithm.

13. The method of claim 12, wherein the trained tree algorithm comprises a trained gradient-boosted tree algorithm.

14. The method of claim 13, which further comprises extracting, by the data calculation engine, the organization, location, and time information from the text, wherein extracting the organization, location, and time information comprises applying a named entity recognition (NER) model to the text.

15. The method of claim 10, wherein determining the importance of the words in the text comprises applying term frequency-inverse document frequency (TFIDF) to the text.

16. A non-transitory computer-readable medium having stored thereon computer-readable instructions executable by a processor to perform operations which comprise:
    receiving a call interaction from a call center;
    validating, by a validation and transcription engine, that the call interaction is authentic;
    converting, by the validation and transcription engine, the call interaction into text;
    calculating, by a data calculation engine, a priority of the call interaction from the text and organization, location, and time information in the text, wherein calculating the priority of the call interaction comprises determining an importance of words in the text and correlating the words in the text to a priority class by using a pre-trained algorithm that is trained on emergency-type and emergency services-type language;
    determining that the call interaction should be transmitted to the call center for initial handling by a call center agent; and
    transmitting the call interaction, the calculated priority, and the organization, location, and time information to the call center.

17. The non-transitory computer-readable medium of claim 16, wherein the pre-trained algorithm is pre-trained on hand-crafted probabilistic grammar.

18. The non-transitory computer-readable medium of claim 16, wherein the pre-trained algorithm comprises a trained tree algorithm.

19. The non-transitory computer-readable medium of claim 18, wherein the trained tree algorithm comprises a trained gradient-boosted tree algorithm.

20. The non-transitory computer-readable medium of claim 19, wherein the operations further comprise extracting, by the data calculation engine, the organization, location, and time information from the text, and wherein extracting the organization, location, and time information comprises applying a named entity recognition (NER) model to the text.

* * * * *